United States Patent
Chua et al.

(10) Patent No.: US 9,365,438 B2
(45) Date of Patent: Jun. 14, 2016

(54) DESALINATION PLANT

(75) Inventors: Hui Tong Chua, Mt. Claremont (AU); Xiaolin Wang, Sandy Bay (AU); Klaus Regenauer-Lieb, Shoalwater (AU)

(73) Assignee: The University of Western Australia, Crawley, Western Australia (AU)

( * ) Notice: Subject to any disclaimer, the term of this patent is extended or adjusted under 35 U.S.C. 154(b) by 425 days.

(21) Appl. No.: 13/808,543

(22) PCT Filed: Jun. 24, 2011

(86) PCT No.: PCT/AU2011/000768
§ 371 (c)(1),
(2), (4) Date: Feb. 20, 2013

(87) PCT Pub. No.: WO2012/003525
PCT Pub. Date: Jan. 12, 2012

(65) Prior Publication Data
US 2013/0153398 A1 Jun. 20, 2013

(30) Foreign Application Priority Data

Jul. 9, 2010 (AU) ................................ 2010903053

(51) Int. Cl.
*C02F 1/04* (2006.01)
*B01D 3/14* (2006.01)

(52) U.S. Cl.
CPC ................ *C02F 1/043* (2013.01); *B01D 3/143* (2013.01); *C02F 1/048* (2013.01)

(58) Field of Classification Search
None
See application file for complete search history.

(56) References Cited

U.S. PATENT DOCUMENTS

| | | | |
|---|---|---|---|
| 3,152,053 A * | 10/1964 | Lynam | 202/173 |
| 3,410,339 A * | 11/1968 | Wiegandt | 165/104.13 |
| 3,574,066 A * | 4/1971 | Kijima et al. | 202/173 |
| 3,613,781 A * | 10/1971 | Barratt | F22B 1/063 122/32 |
| 3,926,739 A | 12/1975 | Izumi | |
| 3,953,972 A | 5/1976 | Awerbuch et al. | |
| 4,009,082 A * | 2/1977 | Smith, Jr. | 203/11 |
| 4,091,623 A * | 5/1978 | Edmondson et al. | 60/641.2 |
| 4,202,177 A * | 5/1980 | Garrett | F03G 7/04 165/45 |
| 4,330,373 A * | 5/1982 | Liu | 202/174 |
| 4,548,043 A * | 10/1985 | Kalina | 60/673 |
| 4,693,304 A * | 9/1987 | Volland | 165/88 |
| 6,105,369 A * | 8/2000 | Peletz, Jr. | F01K 25/065 60/649 |
| 6,715,290 B1 * | 4/2004 | Erickson | F01K 25/065 202/158 |
| 6,833,056 B1 | 12/2004 | Kamiya et al. | |
| 7,922,874 B2 | 4/2011 | Ophir et al. | |
| 8,479,517 B2 * | 7/2013 | Uehara | F01K 7/38 60/649 |
| 8,661,820 B2 * | 3/2014 | Mak | F01K 13/00 60/651 |

(Continued)

OTHER PUBLICATIONS

Darwish et al., "Multi-effect boiling systems from an energy viewpoint," *Desalination* 194:22-39, 2006.

(Continued)

*Primary Examiner* — Renee E Robinson
*Assistant Examiner* — Jonathan Miller
(74) *Attorney, Agent, or Firm* — Klarquist Sparkman, LLP (57) ABSTRACT

There is provided an apparatus 2 for desalinating non-potable water. The apparatus has a first vapor producing module 5 configured to receive a heated working fluid for producing vapor from a volume of non-potable water for driving at least one first distillation module 10 for producing condensate 12. The apparatus also includes a second vapor producing module 14 configured to receive working fluid from the first vapor producing module 5 for producing additional vapor from a further volume of non-potable water 8'.

13 Claims, 10 Drawing Sheets

(56) References Cited

U.S. PATENT DOCUMENTS

| | | | |
|---|---|---|---|
| 2006/0272933 A1* | 12/2006 | Domen et al. | 203/10 |
| 2008/0083605 A1 | 4/2008 | Holtzapple et al. | |
| 2008/0149573 A1* | 6/2008 | Fein et al. | 210/799 |
| 2009/0272134 A1* | 11/2009 | Hulse | C09K 5/047 62/112 |

OTHER PUBLICATIONS

Ophir et al., "Advanced MED process for most economical sea water desalination," *Desalination* 182:187-198, 2005.

International Search Report dated Aug. 15, 2011, from International Application No. PCT/AU2011/000768.

\* cited by examiner

DESALINATION PLANT

CROSS REFERENCE TO RELATED APPLICATIONS

This is the U.S. National Stage of International Application No. PCT/AU2011/000768, filed Jun. 24, 2011, which was published in English under PCT Article 21(2), which in turn claims the benefit of Australian Patent Application No. 2010903053, filed Jul. 9, 2010, which is incorporated herein in its entirety.

FIELD OF THE INVENTION

The present invention relates to an apparatus and a method for desalinating non-potable water.

BACKGROUND OF THE INVENTION

Desalination technology involves producing fresh water from non-potable water sources. With current desalination technology, significant amounts of energy are required to power or drive plants in order to achieve a reasonable yield rates. This energy is typically sourced from available fossil fuels and/or electrical sources, each of which are costly and contribute to carbon emissions. The efficiency of current processes in terms of fresh water yield as it relates to the cost of such energy used in the processes is considerably low.

It will be clearly understood that, although prior art publication(s) and/or uses may be referred to herein, any such references do not constitute an admission that they form a part of the common general knowledge in the art, in Australia or in any other country.

SUMMARY OF THE INVENTION

In the statement of invention; the description of the invention and, the claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

One aspect of the invention provides an apparatus for desalinating non-potable water comprising:
  a first vapour producing module configured to receive a heated working fluid for producing vapour from a volume of non-potable water for introducing to at least one first distillation module for producing condensate;
  a second vapour producing module configured to receive the working fluid for producing additional vapour from a further volume of non-potable water.

The additional vapour may be introduced to at least one of said first distillation modules.

Additionally or alternately the additional vapour may be introduced to drive at least one second distillation module.

The or each first or second distillation module may comprise a heat exchanging portion and a vapour producing portion wherein the vapour producing portion is in thermal communication with said heat exchanging portion.

The apparatus may comprise a plurality of distillation modules wherein vapour produced within the vapour producing portion of one distillation module is transferred to the heat exchanging portion of an adjacent distillation module.

The apparatus may comprise a working fluid circuit that supplies heated working fluid to the first and/or second vapour producing modules.

The working fluid in the circuit may be geothermal water.

Alternately the working fluid circuit may comprise fluid that is heated by being in thermal communication with:
  (i) a geothermal water source; or,
  (ii) a geothermal heat source.

The working fluid circuit may comprise fluid that is heated by being in thermal communication with a heat exchanger in thermal communication with a heat source.

The working fluid circuit may comprise a flash separator in fluid communication with a geothermal water source.

The working fluid circuit may comprise a flash separator in thermal communication with a heating source.

The apparatus may comprise a pre-heater which pre heats the non-potable water with working fluid subsequent to the working fluid flowing through the first vapour producing module.

The pre-heater may be configured to be in fluid communication with one or more of the distillation modules for supplying pre-heated non-potable water thereto.

The apparatus may comprise one or more additional vapour producing modules wherein each of the additional vapour producing modules produces vapour from respective volumes of non-potable water by heat transfer from the working fluid.

The apparatus may comprise a further flash separator in fluid communication with the second vapour producing module for supplying heated working fluid thereto.

The non-potable water may comprise any one of the following
  (i) seawater;
  (ii) ground water;
  (iii) mineralized contaminated water
  (iv) biologically contaminated water;
  (v) brackish water The heating source may comprises any of the following:
  (i) a geothermal water outlet; or,
  (ii) a fluid heated by a renewable energy source; or,
  (iii) waste heat from a non renewable energy source.

A second aspect of the invention may provide a method for desalinating non-potable water comprising the steps of:
  (a) introducing a quantity of heated working fluid to a first vapour producing module to produce a vapour from a volume of non-potable water contained therein;
  (b) supplying said vapour to at least one water distillation module to produce condensate;
  (c) using the heated working fluid to drive one or more additional vapour producing modules each of which produces respective quantities of additional vapour from respective volumes of non-potable water contained therein.

The method may further comprise the step of:
introducing said additional vapour to at least one of said distillation modules for producing condensate therein.

The method may further comprise the step of:
introducing said additional vapour to at least one further distillation module for producing condensate therein.

The method may further comprise the step of:
pre-heating the non-potable water using heated working fluid subsequent to the heated working fluid passing through one or more of the additional vapour producing modules.

The method may further comprise the step of:
collecting condensate from the or each distillation modules, and/or, the or each further distillation modules.

The method may further comprise the step of sourcing thermal energy to provide the heated working fluid from one of the group of:
- a geothermal water source;
- a renewable energy source; or,
- a waste heat source.

The apparatus may comprise a non-return valve between the second vapour producing module and a first distillation module to which the additional vapour is introduced to prevent a back flow of vapour from a location downstream of the valve to the second vapour producing module.

A third aspect of the invention may provide a desalination plant for desalinating non-potable water comprising:
- a first vapour producing module which produces vapour from a volume of non-potable water by heat transfer by a heated working fluid;
- a first bank of one or more series connected distillation modules wherein a first of the distillation modules receives vapour from the first vapour producing module to form a condensate; and,
- one or more additional vapour producing modules each of which produces vapour from respective volumes of the non-potable water by transfer of heat from the heated working fluid.

The heated working fluid may flow in series initially through the first vapour producing module and subsequently through each of the one or more additional vapour producing modules.

Alternately the heated working fluid may be supplied in parallel to the first vapour producing module and a first of the one or more additional vapour producing modules.

The heated working fluid flowing through the first of the additional vapour producing modules may subsequently flow in series through each of the additional vapour producing modules.

The vapour from the one or more additional vapour producing modules may be supplied to one or more of the first distillation modules.

The plant may further comprise respective non-return valves between the one or more additional vapour producing modules and the first distillation modules, each non-return valve being configured to substantially prevent a back flow of vapour from a location downstream of the respective valve to the corresponding additional vapour producing modules.

BRIEF DESCRIPTION OF THE DRAWINGS

Various embodiments, incorporating all aspects of the invention, will now be described by way of example only and with reference to the accompanying drawings, in which.

DETAILED DESCRIPTION OF EMBODIMENTS OF THE INVENTION

Figure 1:
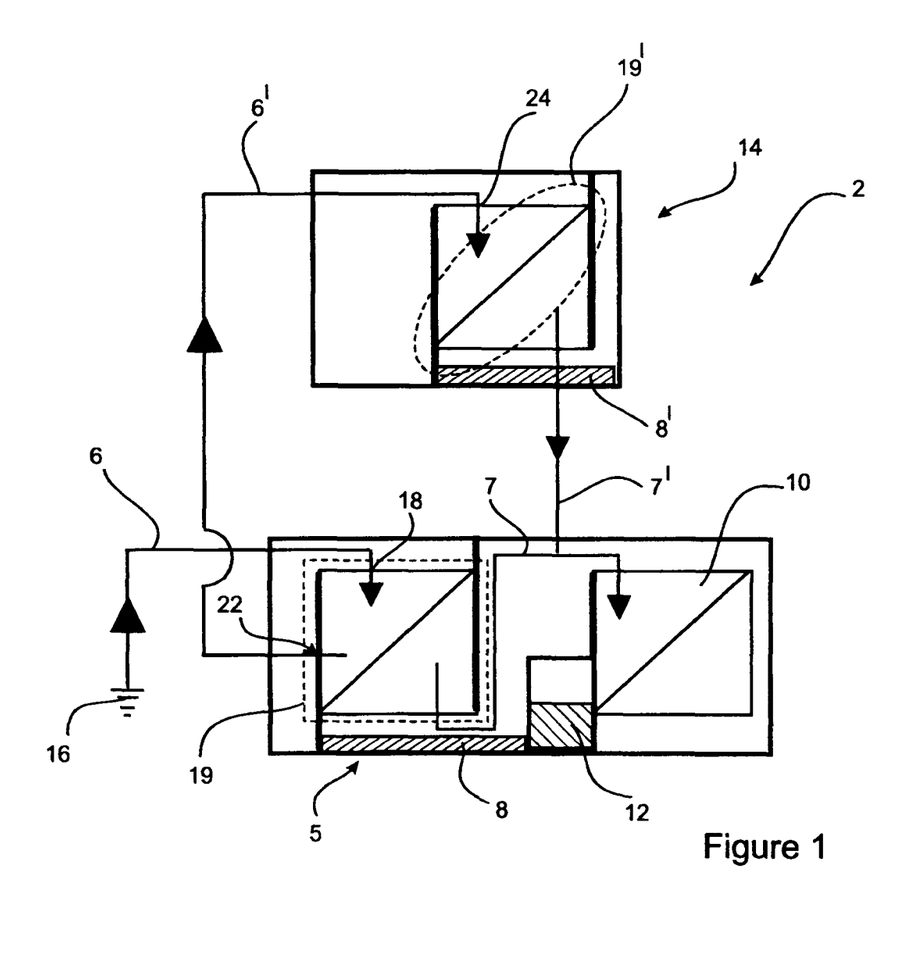
FIG. 1 shows a schematic diagram of one embodiment of a desalination plant in accordance with the present invention.

With reference to FIG. 1 there is shown one embodiment of an apparatus 2 for desalinating non-potable water 8 and 8', which usually originate from the same source. The apparatus 2 comprises a first vapour producing module 5 configured to receive a heated working fluid flowing along a path 6 for producing vapour from a volume of non-potable water 8. The vapour flows along a path 7 and is used for driving at least one first distillation module 10 which produces condensate 12 from the vapour and thus the non-potable water 8. The apparatus 2 further comprises a second vapour producing module 14 configured to receive working fluid flowing along a path 6' from the first vapour producing module 5 which produces vapour from a further volume of non-potable water 8'. In this particular embodiment the vapour flows along path 7' to the first vapour producing module 5.

The heated working fluid emanates from a source 16 and is delivered via flow path 6 to an inlet 18 of the module 5.

Once received within the first vapour producing module 5, the heat content or enthalpy (hereinafter 'enthalpy') of the heated working fluid is transferred or exchanged to the non-potable water 8 for producing vapour which flows along path 7 to the fluidically adjacent distillation module 10. The enthalpy of the heated working fluid is exchanged to the non-potable water 8 by way of a heat exchanger 19 within the first vapour producing module 5.

During the heat exchanging process carried out within the first vapour producing module 5, spent working fluid flows out from the outlet 22 of the first vapour producing module 5 to working fluid inlet 24 of the second vapour producing module 14 via flow path 6'. The second vapour producing module 14 similarly comprises a heat exchanging portion 19' through which enthalpy from the incoming working fluid is exchanged to a further volume of non-potable water 8' contained therein to produce vapour.

As mentioned above, the vapour produced within the second vapour producing module 14 is directed or channeled along flow path 7' which joins with path 7 for combining with the vapour produced within the first vapour producing module 5. The combined vapours flow to the distillation module 10 via continuation of path 7 for increasing the effective enthalpy and vapour content of same entering the distillation module 10 for increasing the amount of condensate produced. It has been found that providing such a 'boost' in enthalpy and vapour content has a favourable effect on the condensate yield. It will be realised however, that the increase in condensate yield requires a commensurate increase in feed of non-potable water to the first and second vapour producing modules 5, 14.

Figure 2A:
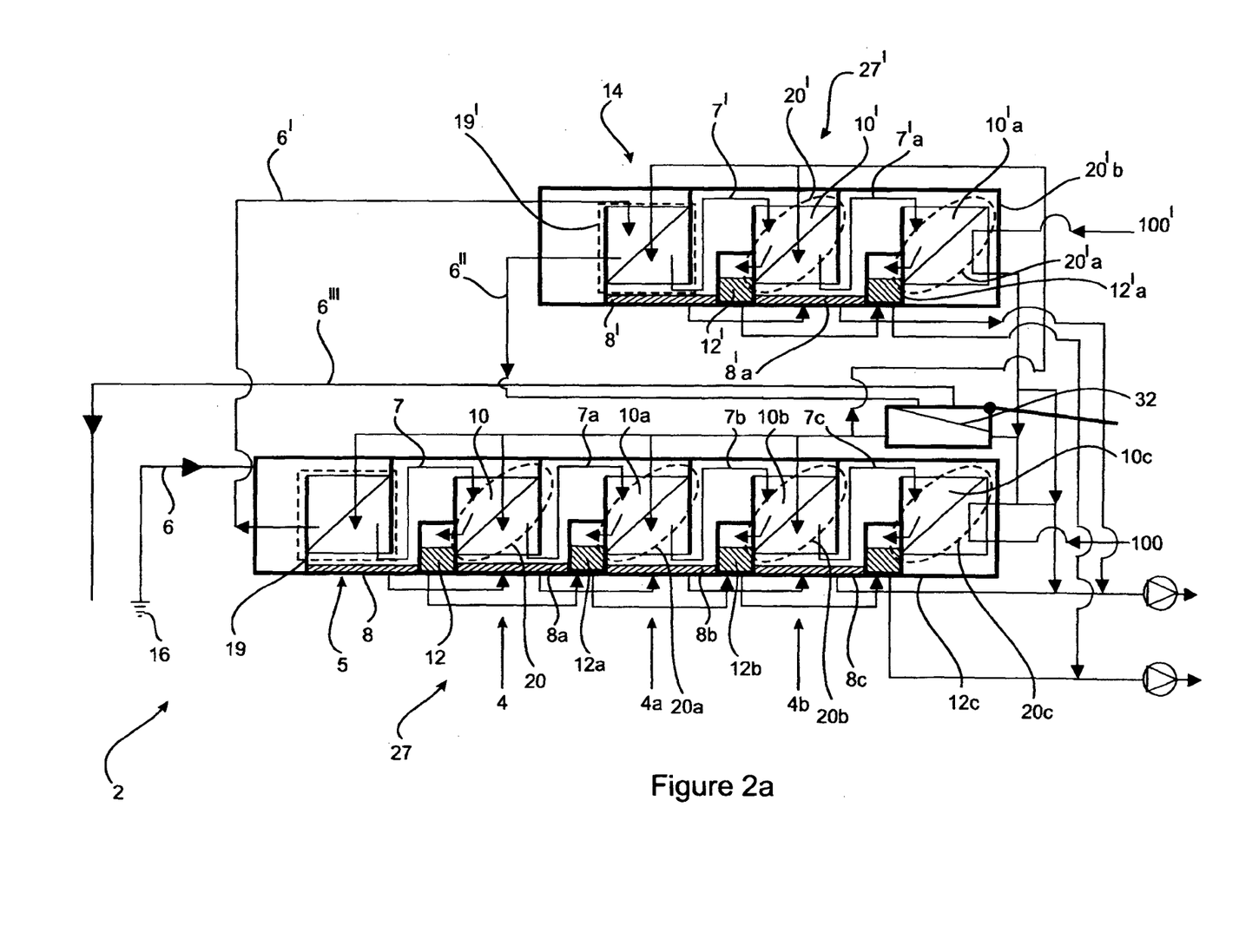
FIG. 2A shows a schematic diagram of another embodiment of the desalination plant.

A further embodiment of the apparatus 2 is shown in FIG. 2a where the first vapour producing module 5 drives a primary distillation bank 27 comprising multiple series connected first distillation modules 10, 10a, 10b and 10c; and the second vapour producing module 14 drives a secondary distillation bank 27' comprising multiple series connected second distillation modules 10' and 10'a. The primary distillation bank 27 is configured to receive the heated working fluid 6.

Heated working fluid 6 emanates from the heating source 16 and flows into the first vapour producing module 5. Enthalpy from the incoming heated working fluid 6 is exchanged within the heat exchanging portion 19 for producing vapour from a volume of non-potable water 8 contained therein. Vapour, once produced, flows along fluid pathway 7 into distillation module 10 producing condensate 12. As this occurs, enthalpy within the vapour is exchanged across a heat exchanging portion 20 for producing additional vapour from the non-potable water 8*a* held within the first distillation module 10. The vapour produced in the module 10, in turn, flows along a pathway 7*a* and is received by a second distillation module 10*a* for producing condensate 12*a* therein. As shown in FIG. 2*a*, this process continues downstream to produce condensate 12*b* and 12*c*. It will be appreciated that additional vapour producing units and/or distillation modules may be included within the primary distillation bank 27 if required.

Working fluid exiting the first vapour producing module 5 of the primary distillation bank 27 and flowing along path 6' is received by the second vapour producing module 14 of a secondary distillation bank 27'. In this embodiment, the secondary distillation bank 27' is of similar configuration to the primary distillation bank 27 whereby a number of vapour producing modules and distillation modules may be configured to be in fluid communication with one another for the purpose of producing condensate.

The working fluid entering the second vapour producing module 14, is used to produce additional vapour which flows along pathway 7' and is received by a further distillation module 10' for producing condensate 12'. As previously described with respect to the primary distillation bank 27, this process continues downstream for producing vapour used in the production of condensate 12'*a*. It will therefore be appreciated that the secondary distillation bank 27' is primarily powered or driven by the spent working fluid from the first vapour producing module 5 from the primary distillation bank 27. However, it will also be understood that additional energy may be required to assist in developing the required enthalpy of the non-potable water 8' in order to produce or generate the additional vapour within the second vapour providing module 14. For example, in one embodiment, the secondary vapour producing module 14 may comprise a means for varying the effective internal pressure, such as for example applying a negative pressure within the second vapour producing module 14 for increasing the enthalpy of the non-potable water 8'. It may be appreciated that each vapour producing unit employed may also be configured with a similar means for applying a negative pressure to the module for encouraging vapour to be produced therein.

The working fluid is output from the second vapour producing module 14 of the secondary distillation bank 27' along pathway 6'' and transferred to a pre-heater 32. In one embodiment, the pre-heater 32 comprises a heat exchanger whereby enthalpy from the admitted working fluid along pathway 6'' is exchanged to non-potable water 8, 8*a*, 8*b*, 8*c*, 8', 8'*a* which is then fed to the pre-heater 32 from non-potable water sources 100 and 100'. The non-potable water may comprise any one of the following (i) seawater;
(ii) ground water;
(iii) mineralized contaminated water;
(iv) biologically contaminated water;
(v) brackish water.

For the embodiment shown in FIG. 2*a*, non-potable water is received from non-potable water sources 100' and 100 and supplied to the heat exchanger 20'*a* of the distillation module 10'*a* of the secondary distillation bank 27' and heat exchanger 20*c* of the primary distillation bank 27 respectively and heated before admission to the pre-heater 32. The pre-heated non-potable water is then dispersed to one or more of the vapour producing units that comprise either or both of the primary and secondary distillation banks 27, 27'.

Any one of condensates 12, 12*a*, 12*b*, 12*c*, 12' and 12'*a* produced from respective distillation banks 27, 27' may be collected and provided for further processing.

Figure 2B:
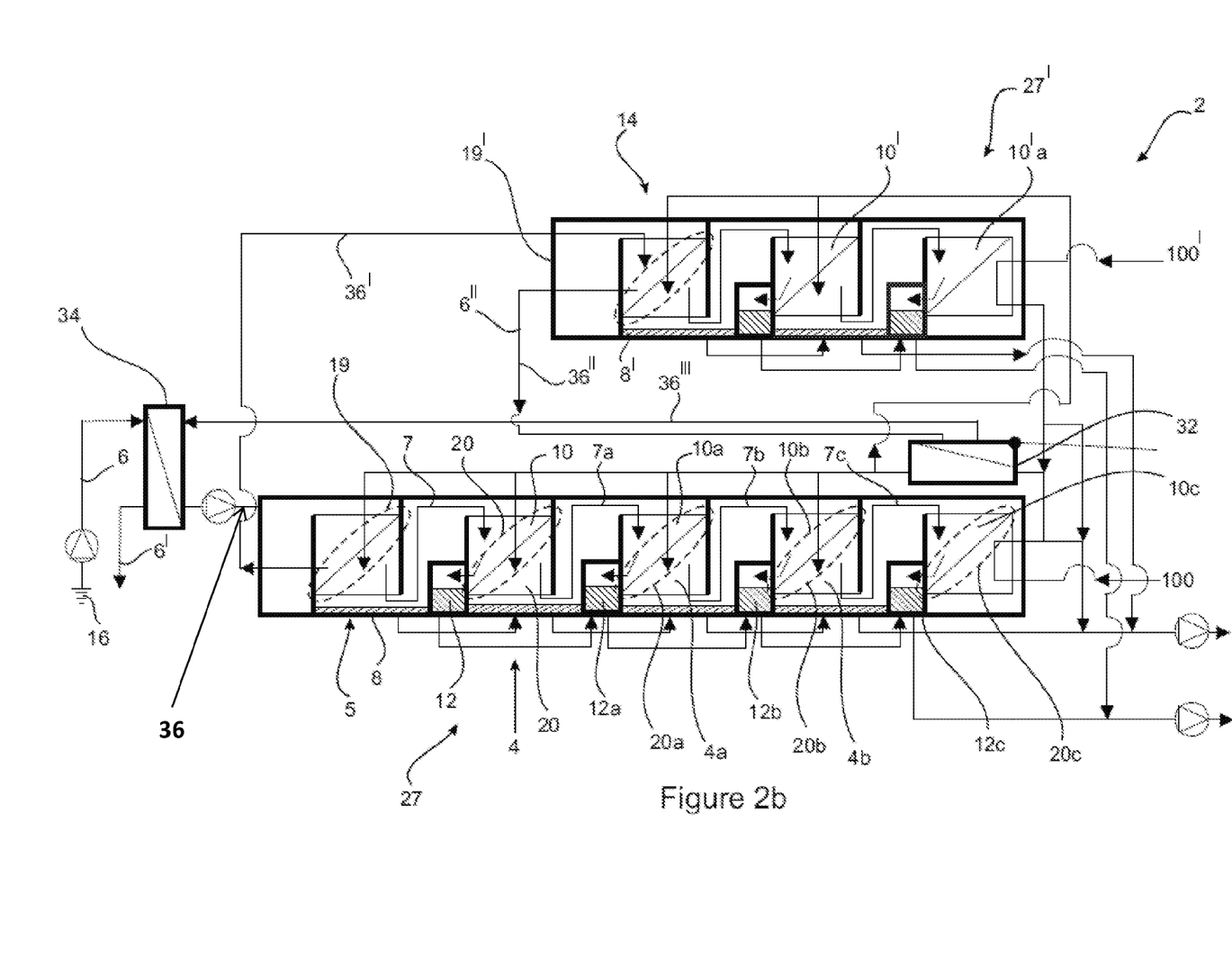
FIG. 2B shows a schematic diagram of the embodiment of FIG. 2A incorporating a heat exchanger.

A further embodiment of the apparatus 2 is shown in FIG. 2*b*. In this embodiment, the configuration and operation of the primary and secondary distillation banks 27, 27' remains substantially the same. However, a heat exchanger 34 is incorporated within the circuit at an upstream point and interfaces with the heating supply source 16. In this embodiment, heated energy from source 16 is exchanged to the working fluid and enters the heat exchanger 34 along a pathway 6. The enthalpy of heated working fluid is exchanged to a second heated working fluid that flows along pathway 36 for admission to the first vapour producing module 5 of the primary distillation bank 27. Once the enthalpy from the incoming heated fluid 36 is exchanged via heat exchanger 19, working fluid 36' is released from the first vapour producing module 5 and admitted to the second vapour producing module 14 of the secondary distillation bank 27' along pathway 36'. The operation of the desalination apparatus 2 continues as per the previous description for the embodiment of the apparatus shown in FIG. 2*a*. Once working fluid exits the pre-heater 32 along pathway 36', it is admitted to heat exchanger 34 for receiving enthalpy from incoming heated working fluid from the heating source 16 entering the heat exchanger 34 along path 6. It will be understood that the cycle is continuous in the production of condensate.

Figure 2C:
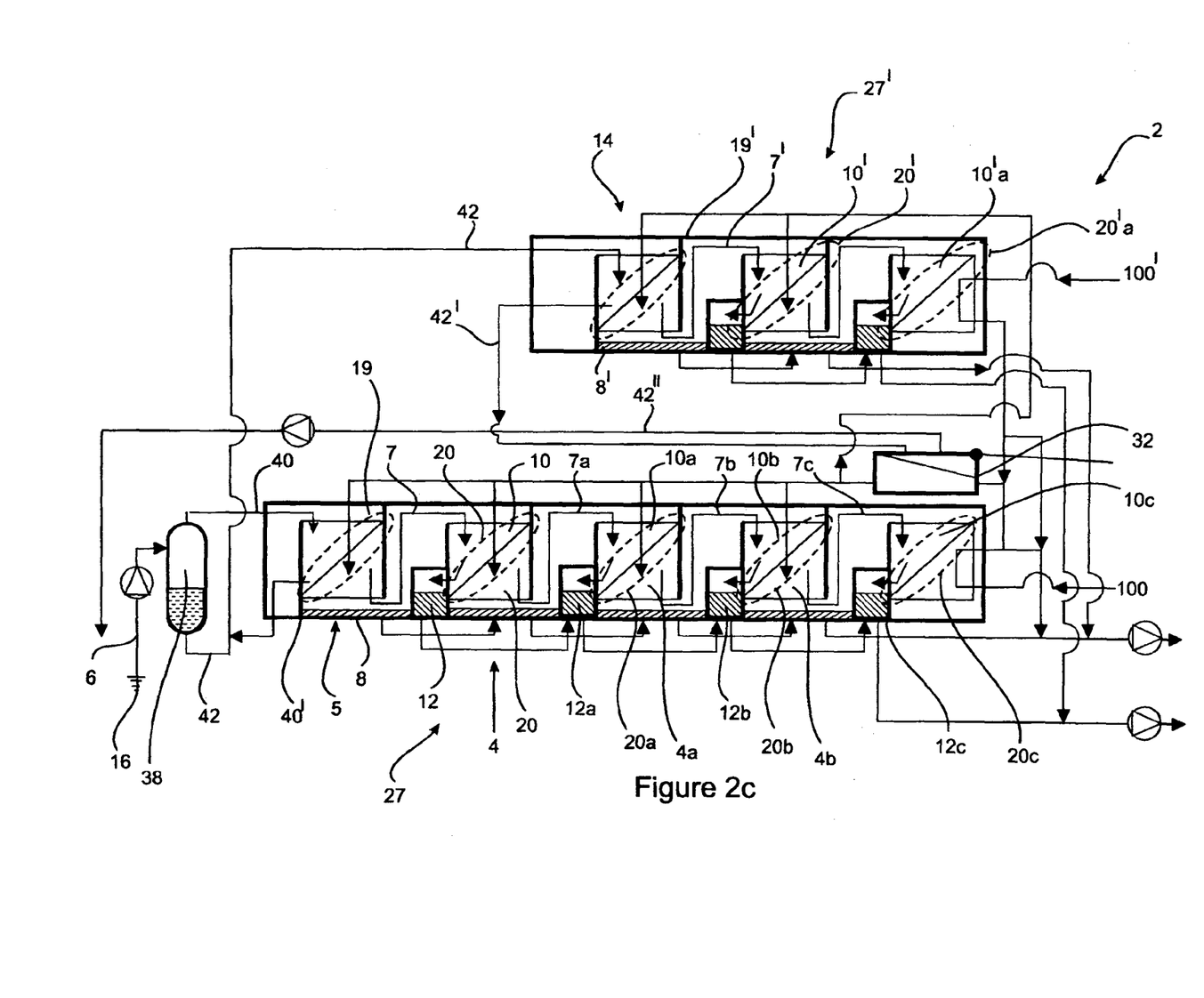
FIG. 2C shows a schematic diagram of the embodiment of FIG. 2A incorporating a flash separator.

A further embodiment of the apparatus 2 is shown in FIG. 2*c*. In this embodiment, the use of primary and secondary distillation banks 27, 27' is again retained however, a flash separator 38 is substituted into the system in place of the heat exchanger 34. In this embodiment, flash separator 38 receives heated working fluid from heating source 16 along pathway 6. The steam output from the flash separator 38 is then used to drive the primary distillation bank 27. Furthermore, the unflashed liquid in the flash separator 38 is used to power the secondary distillation bank 27'. For the embodiment shown, residual or waste steam output from the first vapour producing module 5 of the primary distillation bank 27 is fed to the pathway 42 and delivered to the second vapour producing module 14 of the secondary distillation bank 27'. Once the enthalpy of the unflashed liquid from the flash separator 38 has been exchanged to produce vapour, the unflashed liquid is output from the secondary distillation bank 27' along pathway 42' and admitted to the pre-heater 32. As per the previous embodiments shown in FIGS. 2*a*, 2*b*, enthalpy is exchanged from the working fluid in the pre-heater 32 to heat the incoming non-potable water 8, 8'. Working fluid exits the pre-heater 32 along pathway 42'' and is subsequently released from the system.

It will be appreciated that a flash separator may also be configured, or, the relevant fluid circuits configured in such a manner so as to be arranged in fluid communication with the second vapour producing module 14 for supplying heated working fluid thereto (this configuration not shown)

Figure 2D:
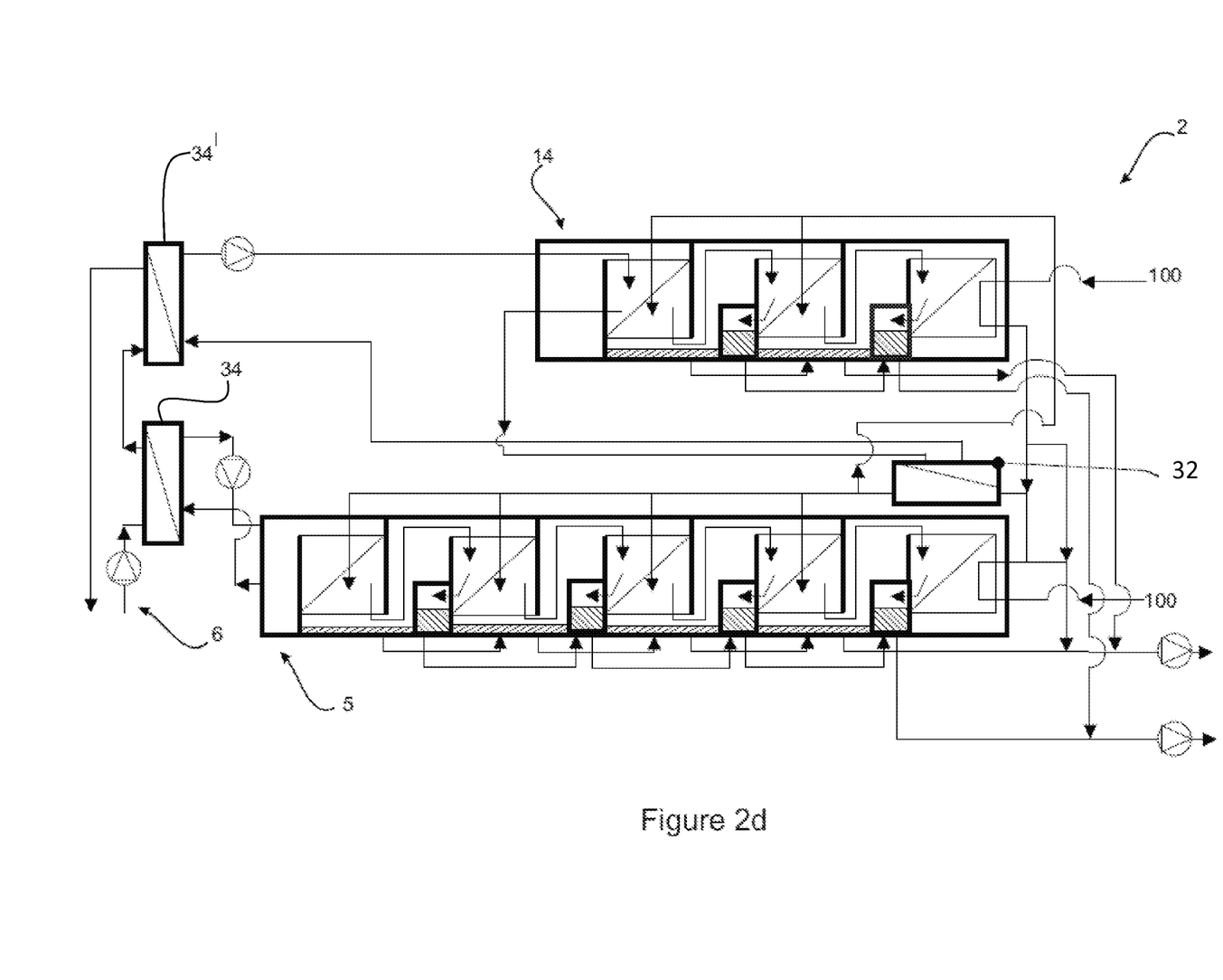
FIG. 2D shows a modified form of the desalination plant of FIG. 2B with an additional ground water heat exchanger.

FIG. 2D shows a modified form of the apparatus shown in FIG. 2A where a second ground water heat exchanger 34' is coupled with the first heat exchanger 34. Thus the ground water 6 passes first through the heat exchanger 34 then through heat exchanger 34' before being returned to the ground. The heat exchanger 34' heats the working fluid for the second vapour producing module 14.

Figure 3A:
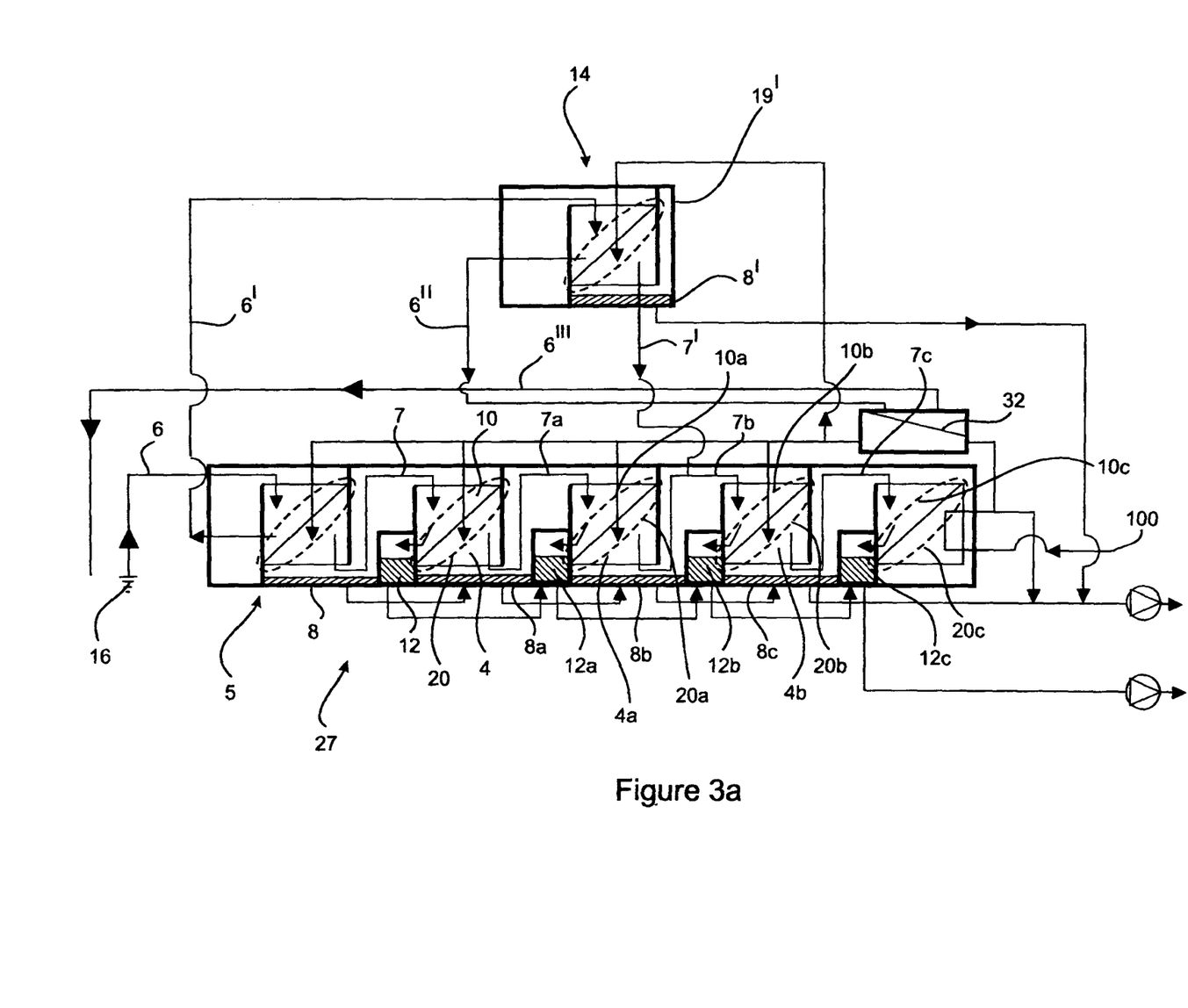
FIG. 3A shows a schematic diagram of another embodiment of the desalination plant.

Another embodiment of the apparatus 2 is shown in FIG. 3*a*. In this embodiment, the primary distillation bank 27 is again retained for receiving a heated working fluid from a heating source 16 along a pathway 6. The secondary distillation bank 27' is omitted in favour of a single or second vapour producing module 14 in accordance with the embodiment shown in FIG. 1. In the current embodiment, the pre-heater 32 is retained to receive working fluid from the second vapour producing module 14. Pre-heater 32 is retained along pathway 6" and pre-heats the non-potable water 8 for admission to the second vapour producing (as non-potable water 8') module 14 as well as one or more of the vapour producing units of the primary distillation bank 27. Further embodiments of the configuration of the apparatus 2 shown in FIG. 3a are presented in FIGS. 3b and 3c where the system is modified to include the heat exchanger 34 and flash separator 38 respectively.

Figure 3B:
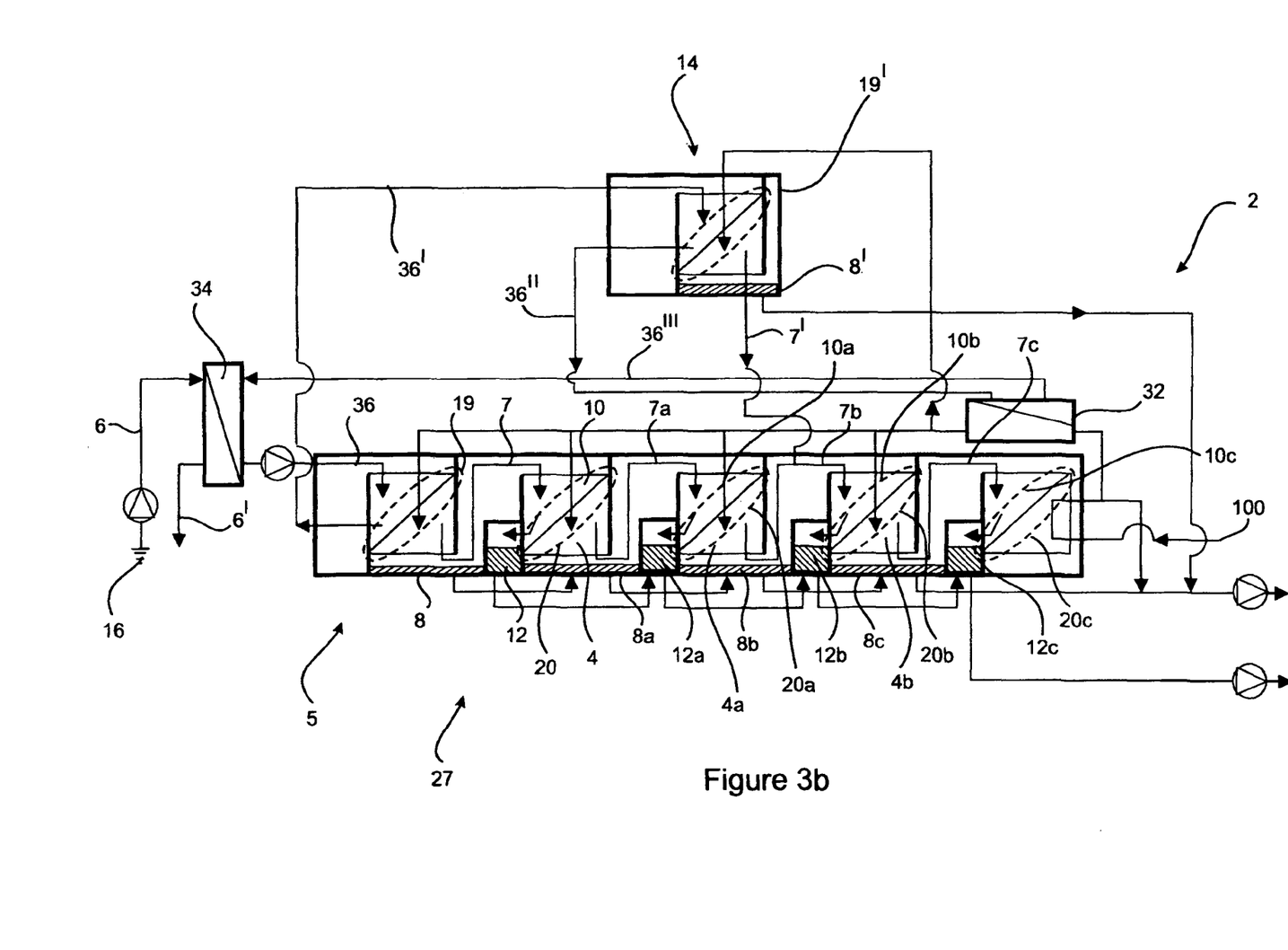
FIG. 3B shows a schematic diagram of the embodiment of FIG. 3A incorporating a heat exchanger.
Figure 3C:
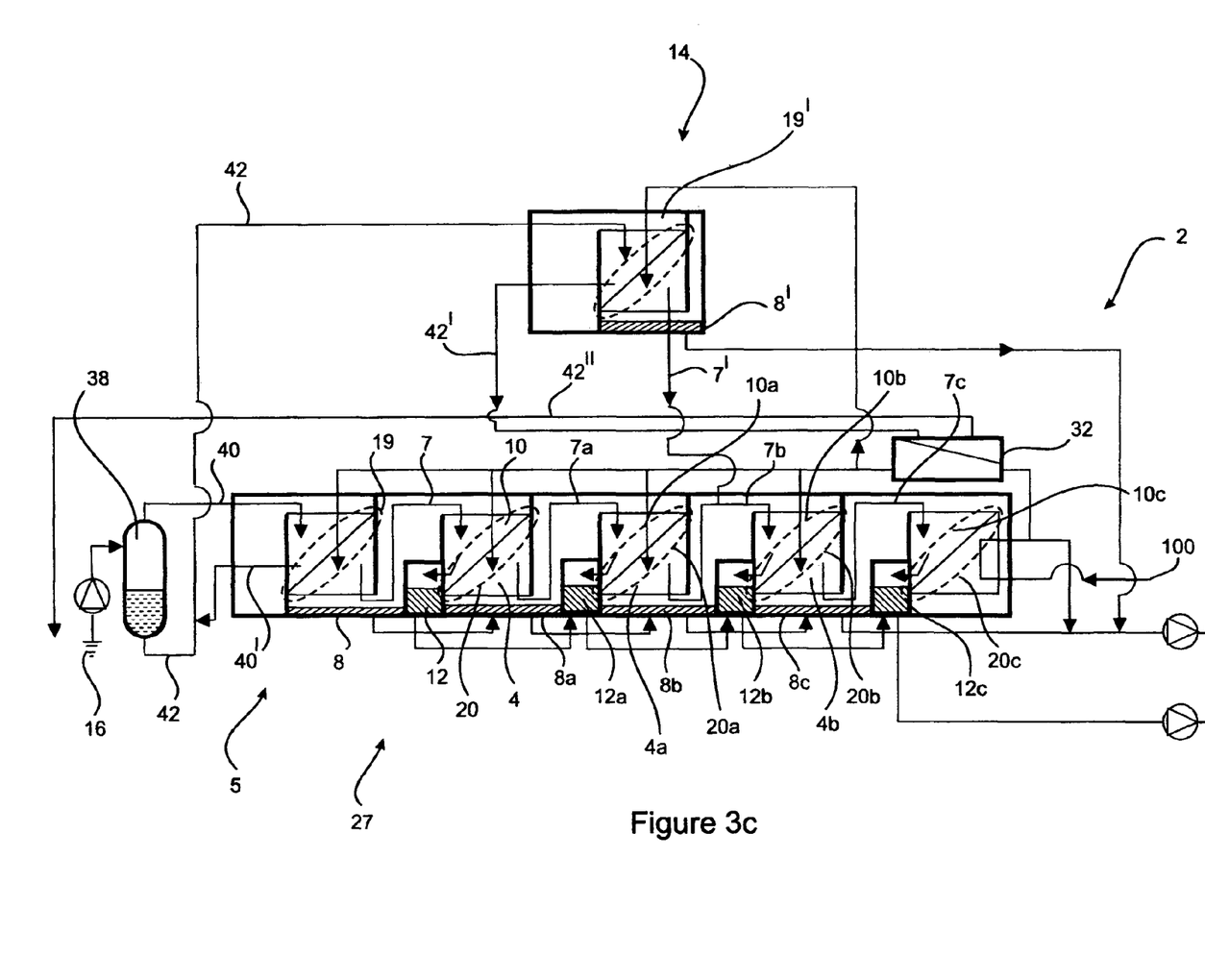
FIG. 3C shows a schematic diagram of the embodiment of FIG. 3A incorporating a flash separator; and, FIG. 3D shows a modified form of the desalination plant of FIG. 3A with an additional ground water heat exchanger.

For the embodiments of the apparatus 2 shown in FIGS. 3a, 3b and 3c, the second vapour producing module 14 similarly receives working fluid output from the first vapour producing module 5 along pathway 6' (shown in FIG. 3a) and enthalpy therein exchanged to the non-potable water 8' for producing vapour therefrom. However, in accordance with the embodiment of the apparatus 2 shown in FIGS. 2a, 2b and 2c additional vapour produced is combined with any of the vapour streams along pathways 7, 7a, 7b and 7c, prior to being received by respective distillation module(s). The effect of the combination is to augment or 'boost' the enthalpy and vapour content to re-energise the vapour flow. For the embodiment shown in FIGS. 3a, 3b and 3c, the additional vapour is combined with the vapour flowing along pathway 7b (produced from the vapour producing module 4a) and flows into distillation module 10b for producing condensate 12b. It will be appreciated that, in other embodiments, it would be possible for the additional vapour to be combined or introduced to vapour flowing from any of the vapour distribution modules so as to augument the enthalpy and vapour content.

Figure 3D:
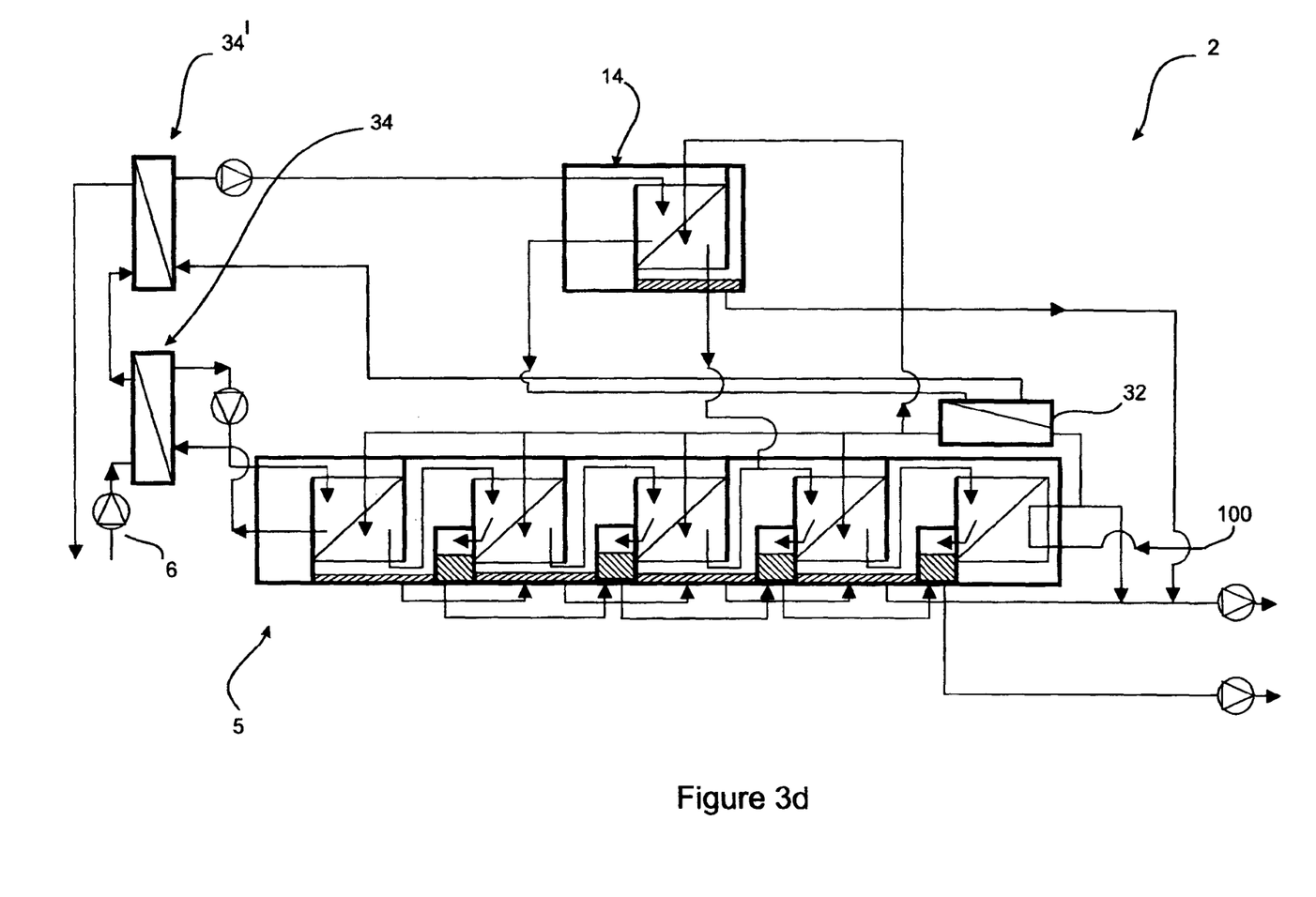

FIG. 3D shows a modified form of the apparatus shown in FIG. 3B where a second ground water heat exchanger 34' is coupled with the first heat exchanger 34. Thus the ground water 6 passes first through the heat exchanger 34 then through heat exchanger 34' before being returned to the ground. The heat exchanger 34' heats the working fluid for the second vapour producing module 14.

Figure 4:
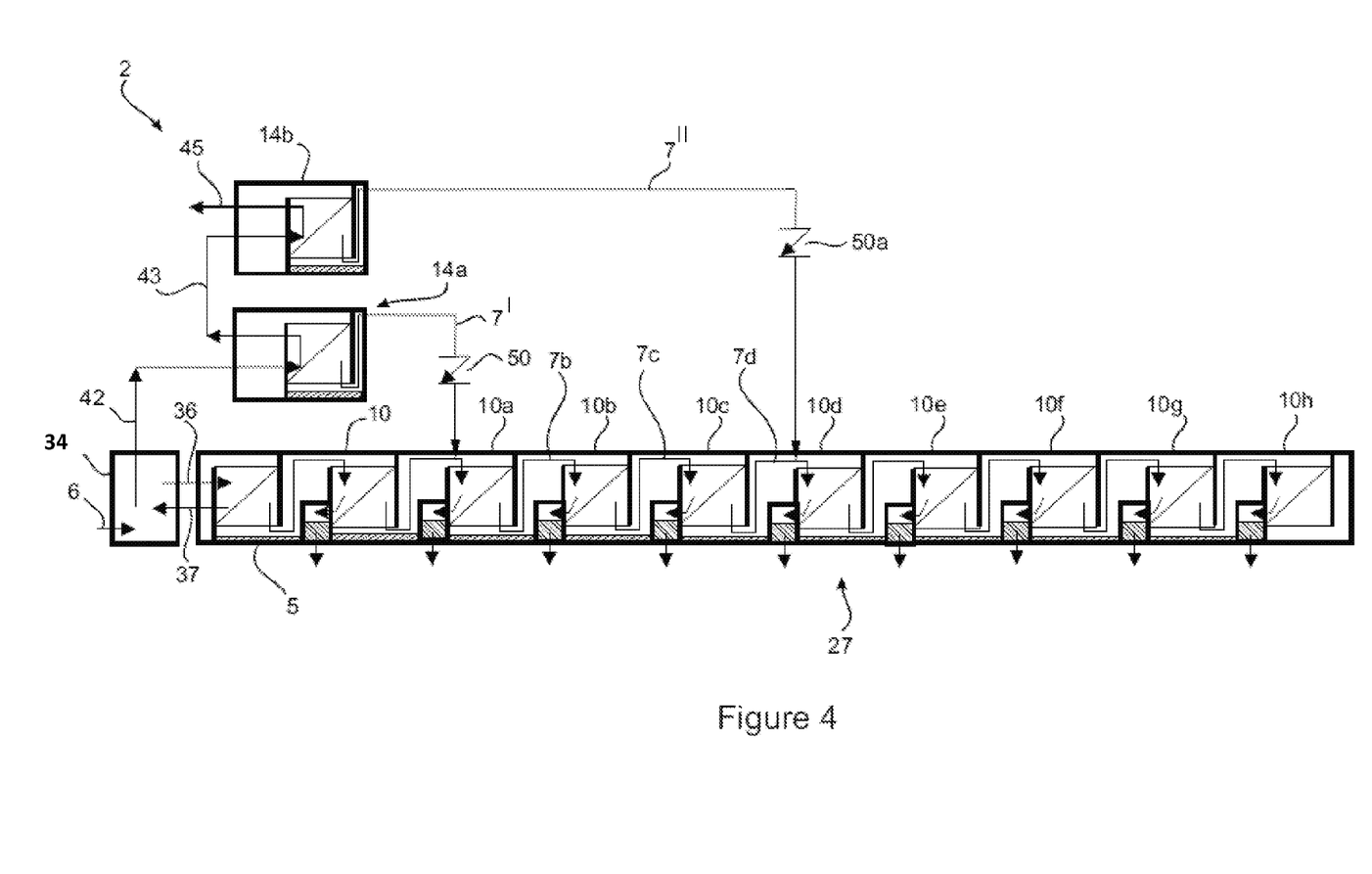
FIG. 4 is a schematic representation of a further embodiment of the present invention.

FIG. 4 illustrates a further embodiment of the apparatus 2 for the desalination of non-potable water. The apparatus in this Figure is similar to that depicted in FIGS. 3a-3c and comprises: a primary distillation bank 27 which comprises a primary vapour producing module 5 and a series of distillation modules 10-10h; and separate second and third vapour producing modules 14a and 14b. The operation of the first vapour producing module 5 and the distillation modules 10-10h is identical to that described above in relation to FIG. 3a-3c, the only difference of course being the increased number of distillation modules. In this embodiment, the incoming heated water flows through path 6 to a heat exchanger 34. The pure liquid water upon receiving the heat from the heat exchanger 34 drives the first vapour producing module 5 of the distillation bank 27 via a pathway 36, with the cooled liquid water returning to the heat exchanger 34 via a return path 37. The cooled liquid from the heat exchanger 34 flows via path 42 to the second vapour producing module 14a. The further cooled liquid from the second vapour producing module 14a flows via a pathway 43 to a third vapour producing module 14b. Thereafter, the spent working fluid flows via flow path 45 to a pre-heater (not shown) similar to the pre-heater shown in FIG. 3c. The embodiment depicted in FIG. 4 is particularly useful when the working fluid is provided at a temperature above 90° C., for example 160° C. In this embodiment, residual heat from the working fluid from the second vapour producing module 14a is sufficient to drive the third vapour producing module 14b.

Vapour from the second vapourisation module 14a flows through path 7' via a one way valve 50 to combine with vapour flowing in the path 7a. Vapour produced by the first distillation module 10 flows via the path 7a to the second in the primary distillation module 10. The combined vapour from paths 7a and 7' effectively increases the enthalpy and vapour input to the distillation module 10a.

Vapour produced by the third vapour producing module 14b flows along pathway 7" via a one way valve 50a to combine with vapour flowing along path 7d between the modules 10c and 10d. Thus the vapour produced by the module 14b increases the vapour and heat content of the flow to the module 10d.

The provision of one way check valves as described above in relation to the apparatus 2 shown in FIG. 4, may also of course be incorporated in each of the above described embodiments where vapour from one module is joining or added to vapour in a preexisting flow path between adjoining modules. For example, with reference to FIG. 1 a one way check valve may be placed in path 7' to prevent a flow of vapour from the path 7 to the path 7' back to the module 14; and in FIG. 3c the one way valve may be placed in path 7' to similarly prevent a flow of vapour from the path 7b through the path 7' to the module 14.

Any of the embodiments shown in the accompanying Figures, described herein may be implemented with the heated working fluid being heated by any renewable energy source, such as, for example, thermal or solar power energy. Further, heat may also be obtained from waste heat from any non-renewable energy source. In one embodiment, the heated working fluid source 16 is a geothermal energy source or outlet supplying heated water of, for example, 90° C. Admission of this heated water to the first vapour producing module 5 may, for example, reduce the temperature of the water to 75° C. when flowing along pathway 6'. Water of this temperature however, still remains capable of driving the second vapour producing module 14 for producing additional vapour from the non-potable water. Typical inlet temperatures of non-potable water may be in the order of 31° C. Further, example temperatures of the vapour following pathways 7, 7a and 7b is in the order of 72° C., 69° C. and 66° C. respectively.

In current desalination systems, a booster unit would need to be run separately requiring additional power/energy thus incurring more cost, and effectively diminishing the efficiency of the distilled water yield as a function of energy input. Exploitation of the present system with geothermally heated water has been found to increase the effective yield efficiency significantly. However it will be appreciated that waste heat from any industrial process may also be, once harnessed, used in the present process to produce vapour from non-potable water in one or both of the vapour producing modules. Further, such waste heat may also be used to assist in preheating the non-potable water before being admitted to each of the vapour producing modules.

For the embodiment of the apparatus 2 shown in FIGS. 1 through 4, a geothermal energy source supplying hot water is utilized. It will be appreciated that the supply rate of the heated water may be increased or augmented in accordance with the principle of convection. In essence, continuity of extraction of the heated supply water would be effectively increased as the temperature difference between water removed from the source and water discarded increases. As the convection cycle develops, the velocity of the water near the surface will increase thus, in turn, increasing the extraction rate of the heated water. This, in-turn, can further increase the efficiencies of the system.

It would be appreciated that the benefits obtained by feeding or driving the second vapour producing module 14 with waste or residual working fluid expelled from the first vapour producing module 5 are significant in that sufficient heat still remains in the waste/residual working fluid requiring little, if any, extra energy to produce vapour from non-potable water in the second vapour producing module 14.

Numerous variations and modifications will suggest themselves to persons skilled in the relevant art, in addition to those already described, without departing from the basic inventive concepts. All such variations and modifications are to be considered within the scope of the present invention, the nature of which is to be determined from the above description.

The claims defining the invention are as follows:

1. An apparatus for desalinating non-potable water comprising:
    a first vapor producing module configured to receive a heated working fluid for producing vapor from a volume of non-potable water;
    at least one distillation module in fluid communication with the first vapor producing module and arranged to receive the vapor from the first vapor producing module and produce a condensate from the vapor;
    a second vapor producing module;
    a heated working fluid flow path providing fluid communication between the first and second vapor producing modules; and
    a vapor flow path providing fluid communication between the second vapor producing module and the at least one distillation modules;
    wherein the second vapor producing module is configured to receive the heated working fluid from the first vapor producing module through the heated working fluid flow path, the second vapor producing module being capable of producing additional vapor from a further volume of non-potable water wherein the second vapor producing module adds the additional vapor is to the vapor produced by the first vapor producing module and the vapor flow path introduces the additional vapor and the vapor produced by the first vapor producing module to the at least one distillation module.

2. The apparatus according to claim 1 wherein the heated working fluid is geothermal water.

3. The apparatus according to claim 2 wherein the working fluid is heated by being in thermal communication with a heat source, wherein the heat source is a geothermal water source or a geothermal heat source.

4. The apparatus according to claim 1 wherein the apparatus further comprises a flash separator in fluid communication with a geothermal water source.

5. The apparatus according to claim 1 wherein the apparatus comprises a flash separator in thermal communication with a heating source.

6. The apparatus according to claim 5 further comprising a further flash separator in fluid communication with the second vapor producing module for supplying heated working fluid thereto.

7. The apparatus according to claim 1 further comprising a non-return valve between the second vapor producing module and the at least one distillation module to which the additional vapor is introduced to prevent a back flow of vapor from a location downstream of the valve to the second vapor producing module.

8. A desalination plant for desalinating non-potable water comprising:
    a first vapor producing module which produces vapor from a volume of non-potable water by heat transfer by a heated working fluid;
    a first bank of one or more series connected distillation modules wherein a first of the distillation modules receives vapor from the first vapor producing module to form a condensate;
    one or more additional vapor producing modules;
    a working fluid flow path providing series fluid communication between the first vapor producing module and each of the one or more additional vapor producing modules; and
    wherein each one or more additional vapor producing modules is capable of producing additional vapor from respective volumes of the non-potable water by transfer of heat from the heated working fluid flowing through the working fluid flow path, wherein the additional vapor producing modules add the additional vapor to the vapor produced by the first vapor producing module, and a vapor flow path providing fluid communication between the first vapor producing module and the one or more series connected distillation modules introduces the additional vapor and the vapor produced by the first vapor producing module into the one or more series connected distillation modules; and
    wherein the heated working fluid flows in series initially through the first vapor producing module and subsequently through each of the one or more additional vapor producing modules.

9. The plant according to claim 8 wherein vapor from the one or more additional vapor producing modules is supplied to one or more of the series connected distillation modules.

10. The plant according to claim 9 further comprising respective non-return valves between the one or more additional vapor producing modules and the series connected distillation modules, each non-return valve being configured to substantially prevent a back flow of vapor from a location downstream of the respective valve to the corresponding additional vapor producing modules.

11. A method for desalinating non-potable water comprising:
    introducing a quantity of heated working fluid to a first vapor producing module to produce a first vapor from a volume of non-potable water contained therein;
    supplying the first vapor from the first vapor producing module to at least one distillation module in fluid communication with the first vapor producing module to produce condensate;
    using the heated working fluid to drive one or more additional vapor producing modules that are fluidly coupled to the first vapor producing module through a heated working fluid flow path, wherein each of the one or more additional vapor producing modules produces respective quantities of additional vapor from respective volumes of non-potable water contained therein;
    adding the additional vapor to the first vapor by directing the additional vapor from the one or more additional vapor producing modules through a vapor flow path providing fluid communication between the one or more additional vapor producing modules and the at least one distillation module; and
    introducing both the additional vapor and the first vapor to the at least one distillation module by flowing the additional vapor and the first vapor through the vapor flow path from the one or more additional vapor producing modules to the at least one distillation module to thereby produce condensate therein.

12. The method according to claim 11 further comprising pre-heating the non-potable water using heated working fluid subsequent to the heated working fluid passing through one or more of the additional vapor producing modules.

13. The method according to claim 11 further comprising selecting a source of thermal energy to provide the heated working fluid, wherein the source of thermal energy is a geothermal water source, a renewable energy source, or a waste heat source.

* * * * *